(12) United States Patent
Rigoni et al.

(10) Patent No.: US 11,333,486 B2
(45) Date of Patent: May 17, 2022

(54) ANGLE SENSOR WITH OFFLINE ERROR CORRECTION

(71) Applicant: Allegro MicroSystems, LLC, Manchester, NH (US)

(72) Inventors: Nicolas Rigoni, Buenos Aires (AR); Octavio H. Alpago, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 354 days.

(21) Appl. No.: 16/593,308

(22) Filed: Oct. 4, 2019

(65) Prior Publication Data
US 2021/0102798 A1 Apr. 8, 2021

(51) Int. Cl.
*G01B 9/02055* (2022.01)
*G01B 7/30* (2006.01)
*G01R 1/00* (2006.01)

(52) U.S. Cl.
CPC .............. *G01B 9/0207* (2013.01); *G01B 7/30* (2013.01)

(58) Field of Classification Search
CPC ........ G01D 1/00; G01B 1/00; G01B 2210/00; G01R 1/00
See application file for complete search history.

(56) References Cited

U.S. PATENT DOCUMENTS

| 9,377,285 | B2 | 6/2016 | Romero et al. | |
| 9,389,060 | B2 | 7/2016 | Romero et al. | |
| 9,400,164 | B2 | 7/2016 | Daubert et al. | |
| 10,120,042 | B2 | 11/2018 | Diaconu et al. | |
| 2016/0363638 | A1* | 12/2016 | Daubert | G01R 33/075 |
| 2017/0276740 | A1* | 9/2017 | Schmitt | G01R 33/091 |
| 2017/0356967 | A1* | 12/2017 | Romero | G01P 21/02 |
| 2018/0216963 | A1* | 8/2018 | Uberti | G01D 5/145 |
| 2018/0274898 | A1* | 9/2018 | Uchida | G01B 7/30 |
| 2019/0178684 | A1* | 6/2019 | Marauska | G01R 33/0017 |

OTHER PUBLICATIONS

Allegro MicroSystems, LLC Application Note "Advanced On-Chip Linearization in the A1332 Angle Sensor IC", Jan. 13, 2015, 12 pages.
Allegro MicroSystems, LLC datasheet A1337 Precision, Hall-Effect Angle Sensor IC with SPI, and SENT or PWM Outputs, Jan. 25, 2019, 37 pages.

* cited by examiner

*Primary Examiner* — Jermele M Hollington
*Assistant Examiner* — Temilade S Rhodes-Vivour
(74) *Attorney, Agent, or Firm* — Daly, Crowley, Mofford & Durkee, LLP (57) ABSTRACT

An angle sensor can have a plurality of magnetic field sensing elements configured to detect a magnetic field and generate a respective plurality of magnetic field signals. In response to these magnetic field signals, a processor generates an uncorrected angle signal that is indicative of an angle of the magnetic field. An error corrector generates an error value using one or more of the previous samples of the uncorrected angle signal, and a summation element applies the error value to a current sample of the uncorrected angle signal to generate a corrected angle signal. The error corrector can generate the error value by applying a correction factor to a previous sample of the uncorrected angle signal, or by applying a correction factor to a predicted current sample of the uncorrected angle signal.

21 Claims, 3 Drawing Sheets

ANGLE SENSOR WITH OFFLINE ERROR CORRECTION

BACKGROUND

Angle sensors can be used to provide angular position information and rotational speed of a target such as a rotational shaft or other rotational member. These sensors can be used in a wide array of applications such as industrial automation, robotics, power steering, motor position sensing and various vehicle applications such as seatbelt motor systems, transmission actuators, shift-by-wire systems, electronic braking systems and throttle systems.

Error correction can be provided by the angle sensors. Some of these errors can be associated with the device itself, such as device errors associated with the manufacturing process, or errors introduced by non-linearities within the sensor's magnetic field sensing elements, or sensitivity to temperature variations. Other errors can be associated with the system within which the sensor operates such as application-specific performance and sensitivity requirements.

Calibration parameters can be stored onboard the angle sensor within an electronically erasable programmable read-only memory (EEPROM) or any other memory element such that the parameters are readily accessible during error correction procedures.

SUMMARY

Described herein is an angle sensor with a plurality of magnetic field sensing elements that are configured to detect a magnetic field and generate a respective plurality of magnetic field signals. The angle sensor can include a processor that is responsive to the plurality of magnetic field signals and that is configured to generate an uncorrected angle signal that indicates an angle of the magnetic field. Also included is an error corrector that is configured to generate an error value using one or more previous samples of the uncorrected angle signal. The angle sensor can further include a summation element that is responsive to a current sample of the uncorrected angle signal and to the error value, where the summation element can be configured to apply the error value to the current sample of the uncorrected angle signal to generate a corrected angle signal.

In some instances, the error corrector can be configured to apply a correction factor to a previous sample of the uncorrected angle signal to generate the error value. The error corrector can be configured to apply the correction factor to the previous sample of the uncorrected angle signal by applying amplitude and phase correction coefficients to a plurality of harmonics of the previous sample of the uncorrected angle signal to generate the error value. The correction factor corresponds to one or more factory errors associated with the angle sensor.

In other instances, the angle sensor can include a second error corrector that is configured to generate a second error value using one or more previous samples of the corrected angle signal. The angle sensor can also include a second summation element that is responsive to a current sample of the corrected angle signal and to the second error value and configured to apply the second error value to the current sample of the corrected angle signal to generate a second corrected angle signal. In some instances, the second error corrector can be configured to apply a second correction factor to a previous sample of the corrected angle signal to generate the second error value. The second error corrector can be configured to apply the second correction factor to the previous sample of the corrected angle signal by applying a piecewise linear function of one or more correction coefficients to the previous sample of the corrected angle signal to generate the second error value. The second correction factor can correspond to one or more system errors associated with a system in which the angle sensor is operated.

In yet other embodiments, the error corrector can include a predictor that is configured to predict a current sample of the uncorrected angle signal based on the one or more previous samples of the uncorrected angle signal, and apply the correction factor to the predicted current sample of the uncorrected angle signal to generate the error value. The correction factor can correspond to one or more factory errors associated with the angle sensor.

Also described is a method for correcting an angle signal of an angle sensor, wherein the method can include detecting a magnetic field to generate a plurality of magnetic field signals. The method can also include generating an uncorrected angle signal indicative of an angle of the magnetic field and generating an error value using one or more previous samples of the uncorrected angle signal. The method can further include applying the error value to a current sample of the uncorrected angle signal to generate a corrected angle signal.

In some embodiments, detecting the magnetic field can include detecting the magnetic field using a plurality of magnetic field sensing elements. Further embodiments can include generating the uncorrected angle signal using a CORDIC (coordinate rotation digital computer) processor.

Other embodiments include generating the error value by applying a correction factor to a previous sample of the uncorrected angle signal, wherein applying can include applying amplitude and phase correction coefficients to a plurality of harmonics of the previous sample of the uncorrected angle signal. In some instances, the amplitude and phase correction coefficients can correspond to one or more factory errors associated with the angle sensor.

In some instances, the method can include generating a second error value using one or more previous samples of the corrected angle signal and applying the second error value to the corrected angle signal to generate a second corrected angle signal. Applying the second correction factor can include applying a piecewise linear function of one or more correction coefficients to the previous sample of the corrected angle signal. The one or more correction coefficients can correspond to one or more system errors that are associated with a system in which the angle sensor is operated.

In other instances, the method can include predicting the current sample of the uncorrected angle signal based on the one or more previous samples of the uncorrected angle signal and applying a correction factor to the predicted current sample of the uncorrected angle signal.

Still further described is an angle sensor that includes means for detecting a magnetic field to generate a plurality of magnetic field signals and means for generating an uncorrected angle signal indicative of an angle of the magnetic field. Further included in the angle sensor is means for generating an error value using one or more previous samples of the uncorrected angle signal and means for applying the error value to a current sample of the uncorrected angle signal to generate a corrected angle signal.

BRIEF DESCRIPTION OF THE DRAWINGS

The foregoing and other objects, features and advantages will be apparent from the following more particular descrip

DETAILED DESCRIPTION

Figure 1:
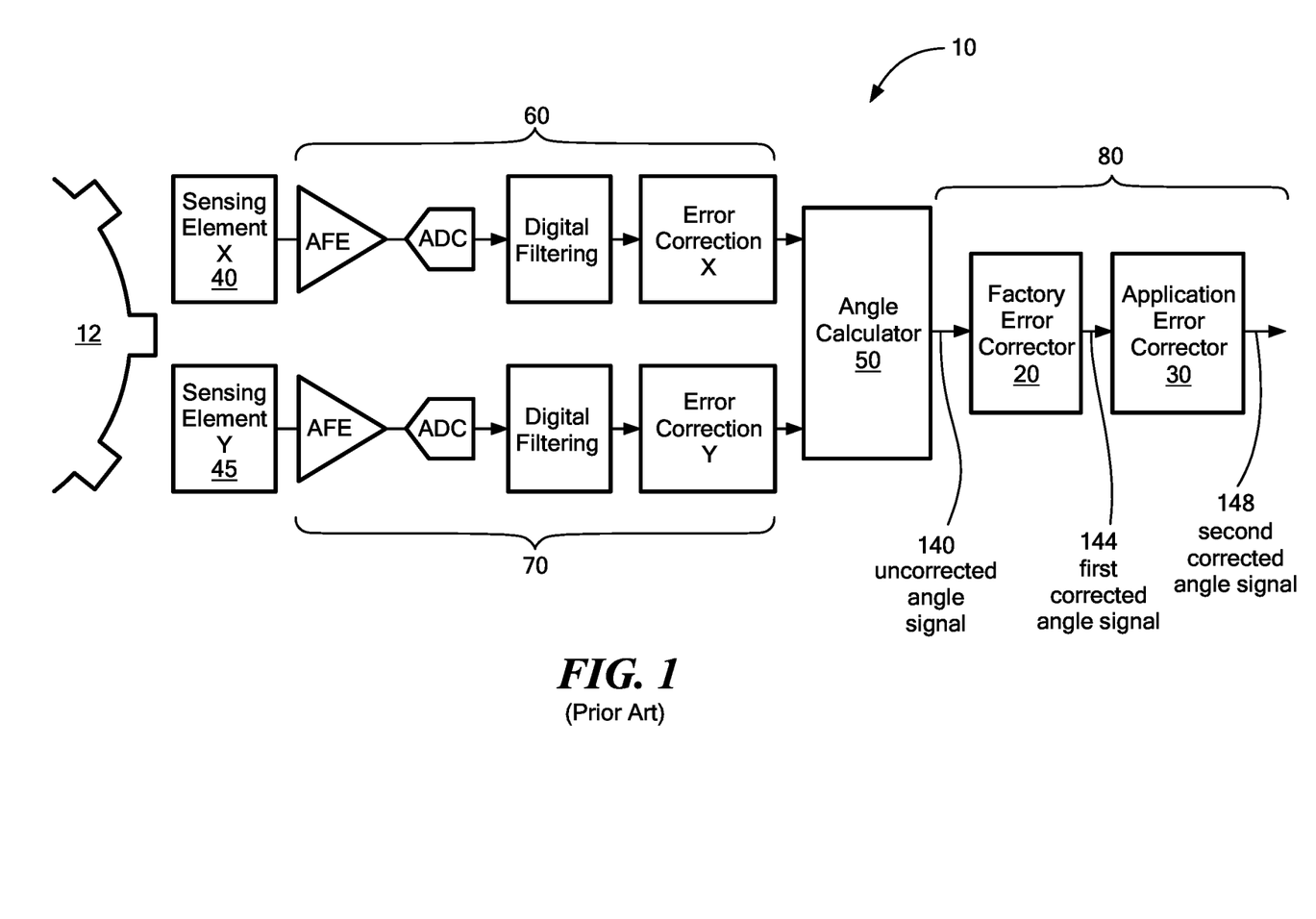
- FIG. 1 is a block diagram illustrating an embodiment of a prior art angle sensor and target.

Illustrated in FIG. 1 is a prior art system for processing angle sensor data. The angle sensor 10 can be any sensor configured to provide angular position information, and in some instances speed and direction information, of a magnetic field associated with one or more targets 12. Additionally, the angle sensor 10 can be a contactless sensor that can provide angular position and speed or direction information of the target 12. The angle sensor 10 can provide this target information over a span of zero to three-hundred-sixty degrees (0°-360°), or a reduced span of one-hundred-eighty degrees (180°). Example targets 12 can include a rotating target 12 such as a gear or magnet attached to a shaft. Illustrated in FIG. 1 is one example of a target 12; the target 12 can be any size or three-dimensional geometry.

The angle sensor 10 can generate high resolution output by executing error correction and calibration applications that error correct and calibrate the angle sensor 10 output to account for manufacturing inconsistencies (as may be referred to herein as factory error correction) and for use in particular end-use applications (as may be referred to herein as application error correction). Manufacturing or fabrication inconsistencies can also be referred to as factory errors and can include device errors associated with manufacture of the angle sensor 10. These factory errors can also include: non-linearities present within the magnetic field sensing elements (i.e., magnetic field sensing element X 40, and magnetic field sensing element Y 45); sensitivity variations of the sensing elements as a result of temperature changes or aging of the device; and non-orthogonality between the sensing channels 60, 70 of the sensing elements 40, 45. Application errors or system errors can include errors that are created when the angle sensor 10 is used in a particular application. These errors can be any non-linearity generated over the angle sensor 10 output as a result of mounting the angle sensor 10 on an application board. For example, in certain applications the angle sensor 10 can be installed on an application board such that the angle sensor 10 is placed outside of a rotation axis of a rotating target. In this example, the out-of-rotation-axis placement causes the angle sensor 10 to generate a non-linear transfer function of the magnetic angle versus the device output despite being used as a linear sensor. In other instances, application errors can be created when the angle sensor 10 is used in an atypical manner such as when the angle sensor 10 is used as a linear sensor thereby causing a non-linear transfer function of the angle versus the output. Still other types of errors are created when the angle sensor 10 does not conform to an application's performance requirements or errors introduced by using the angle sensor 10 in a system that operates at a certain speed, temperature, pressure or other similar parameter.

The angle sensor 10 can be used to sense the angular position, speed and/or the direction of a target 12 using one or more magnetic field sensing elements to detect a magnetic field and output magnetic field signals representative of the sensed magnetic field. These magnetic field sensing elements can be a magneto-transistor or magnetoresistance element, or a semiconductor magnetoresistance element such as an anisotropic magnetoresistance (AMR) sensing element, a giant magnetoresistance (GMR) sensing element, tunnel-magnetoresistance (TMR) sensing element, a magnetic tunnel junction (MTJ) sensing element, Indium Antimonide (InSb) or a Hall Effect element. In some embodiments, the magnetic field sensing element can be arranged to form a circular vertical hall (CVH) sensing element which can include a circular body with a plurality of Hall Effect elements disposed thereon and around the circumference of the circular body.

Further referring to FIG. 1, the angle sensor 10 can have an X sensing channel 60 that receives and processes raw sensor output from magnetic field sensing element X 40, and a Y sensing channel 70 that receives and processes raw sensor output from magnetic field sensing element Y 45. This raw sensor output can be magnetic field signals generated by the magnetic field sensing elements. The magnetic field sensing elements 40, 45 can be arranged orthogonally with respect to each other such that one of the magnetic field sensing elements 40, 45 generates a cosine signal and the other element 40, 45 generates a sine signal.

Each sensing channel 60, 70 can include a series of circuits or components that process the magnetic field signals from the magnetic field sensing elements 40, 45. Included in each sensing channel 60, 70 is an analog front end (AFE) which can include a filter, an amplifier or any other circuit element configured to attenuate or amplify amplitudes or filter frequencies. The AFE receives the magnetic field signals and outputs modified magnetic field signals to an analog-to-digital converter (ADC) to digitize the magnetic field signals. Digital filtering circuitry and error correction circuitry included within the sensing channels 60, 70 receive the digitized magnetic field signals and error correct the digitized signals. In some instances, the digital filtering circuit performs offset correction, sensitivity mismatch compensation and non-orthogonality compensation. It should be appreciated that while FIG. 1 illustrates two magnetic field sensing elements, i.e., magnetic field sensing element X 40 and magnetic field sensing element Y 45, the angle sensor 10 can include more than two magnetic field sensing elements. Additionally, the magnetic field sensing elements can be any magnetic field sensing elements described herein.

An angle calculator 50 receives the digitized magnetic field signals from the X sensing channel 60 and the Y sensing channel 70 and uses the digitized magnetic field signals to generate an uncorrected angle signal 140. This uncorrected angle signal 140 provides an imprecise representation of the magnetic field angle that contains errors. In some instances, the angle calculator 50 can be a circuit comprising one or more logic gates, or a processor configured to compute trigonometric, exponential and logarithmic functions. In other embodiments, the angle calculator 50 is a coordinate rotation digital computer (CORDIC) processor configured to compute an arctangent function. The uncorrected angle signal 140 generated by the angle calculator 50 represents aspects of the sensed magnetic field such as the angular position and/or speed of a target 12.

The uncorrected angle signal 140 is processed by a digital signal processor 80 in order to reduce or remove errors. Illustrated in FIG. 1 is a prior art digital signal processor 80 that error corrects the uncorrected angle signal 140 in a forward path such that each error corrector executes serially. For example, the application error corrector 30 cannot execute until the factory error corrector 20 completes its error correction process and outputs the first corrected angle signal 144. Executing the error correctors 20, 30 in series increases the amount of time between when the magnetic field signals are generated by the magnetic field sensing elements 40, 45 and when the last error corrector 30 outputs a final corrected angle signal 148 thereby increasing the latency of the angle sensor 10. This latency can be mitigated by using faster hardware or parallel hardware architectures however, existing systems may not be capable of supplying the power or providing the space required by faster hardware components or parallel hardware architectures. Additionally, faster hardware components or parallel hardware architectures are often cost prohibitive for certain applications and systems.

The digital signal processor 80 includes a factory error corrector 20 that receives the uncorrected angle signal 140 from the angle calculator 50 and outputs a first corrected angle signal 144. The factory error corrector 20 can sometimes be referred to as a factory angle error corrector, harmonic corrector or a harmonic error corrector, or a first error corrector. In some instances, the factory error corrector 20 can correct aspects such as the offset and gain of the magnetic field sensing element X 40 portion or channel. The factory error corrector 20 can also be used to correct aspects such as the offset and gain of the magnetic field sensing element Y 45 portion or channel. The factory error corrector 20 can also correct errors due to the non-orthogonality of the magnetic field sensing elements 40, 45.

The factory error corrector 20 can use one or more stored coefficients to reduce error in the uncorrected angle signal 140. These coefficients can be stored locally within a memory element on the angle sensor 10 or remotely in a separate memory element. In some instances, the coefficients can be stored during a factory trimming process. When stored in a remote location, the angle sensor 10 can access the stored coefficients through a physical or wireless communication connection (i.e., a serial cable, a USB cable, an ethernet cable, a wireless network connection or any other similar type of connection).

The factory error corrector 20 can process the uncorrected angle signal 140 in a manner illustrated by Equation 1, with which stored coefficients can be applied to harmonic components of the angle signal. Thus, Equation 1 can be used to correct each harmonic error component and generate the first corrected angle signal 144. The coefficients can be error coefficients that correspond to or reflect factory or manufacturing errors, such as those listed above, that may reside within the angle sensor 10.

$$\text{Angle}' = \text{Angle} - \Sigma_{k=0}^{N} A_k \sin(k \text{ Angle} + \theta_k) \quad \text{Equation 1}$$

where Angle' can correspond to the first corrected angle signal 144, Angle can correspond to the uncorrected angle signal 140, $A_k$ is the amplitude coefficient and Ok is the phase coefficient for harmonic k, and "N" represents the number of harmonics over which the summation should operate. For example, when N=4, first corrected angle signal 144 can be determined using harmonics zero through three of the uncorrected angle signal 140.

It should be noted that the error correction performed by the factory error corrector 20 can be performed to correct errors generated as a result of manufacturing or fabrication inconsistencies. Additionally, the error correction can be performed to calibrate the angle sensor 10 according to a predetermined set of standards. For example, the angle sensor 10 may be required to operate within a defined range of voltages or, provide output angles or speed information within a certain tolerance range. Once fabricated into an integrated chip, the electrical components of the angle sensor 10 cannot be modified, therefore the factory error corrector 20 can be provided with hard-coded or programmable coefficients that are used to correct or offset differences between the output and operating characteristics of a manufactured angle sensor 10 and an ideal or standard set of output and operating characteristics.

The digital signal processor 80 includes a second error corrector, the application error corrector 30 which receives the first corrected angle signal 144 from the factory error corrector 20 and outputs a second corrected angle signal 148. The application error corrector 30 can sometimes be referred to as a linearization block that implements one or more piecewise linear correction algorithms to correct or calibrate the first corrected angle signal 144 for system-related requirements. This linear correction algorithm can be:

$$\text{Angle Output} = \text{Angle}' - \left[ \frac{y_{k+1} - y_k}{x_{k+1} - x_k} (\text{Angle}' - x_k) + y_k \right] \quad \text{Equation 2}$$

Where Angle Output can correspond to the second corrected angle signal 148, Angle' can correspond to the first corrected angle signal 144, $\{x_0 \ldots x_{N-1}\}$ in Equation 2 is an ordered set of linearization coefficients that represents the segment boundaries of first corrected angle signal 144 input to the application error corrector 30, and $y_i$ are the angle errors to correct at each $x_i$.

In some instances, the modifications carried out by the application error corrector 30 can be referred to as segmented linearization that uses a set of initial coefficients created by an end user or customer to calibrate the angle sensor 10 for use in a particular application by linearizing the output of the angle sensor 10 to generate the second corrected angle signal 148. To generate these linearization coefficients, an end user can employ the angle sensor 10 in a particular application and permit the angle sensor 10 to obtain samples from the angle sensor 10 within the end-user application over a full rotational range, i.e., zero to three-hundred-sixty degrees. The obtained samples can constitute the set of the linearization coefficients and can correspond to system errors generated as a result of the angle sensor 10 operating within an end-user system.

The prior art angle sensor 10 of FIG. 1 can be an angle sensor 10 that executes a factory error corrector 20 and/or an application error corrector 30 that carries out various processes described in Allegro Microsystems® Application Note 269121, i.e., the Application Information sheet for the Allegro MicroSystems® A1332 chip, *Advanced On-chip Linearization in the A1332 Angle Sensor IC*, Alihusain Sirohiwala and Wade Bussing, the contents of which are hereby incorporated by reference in their entirety.

Figure 2:
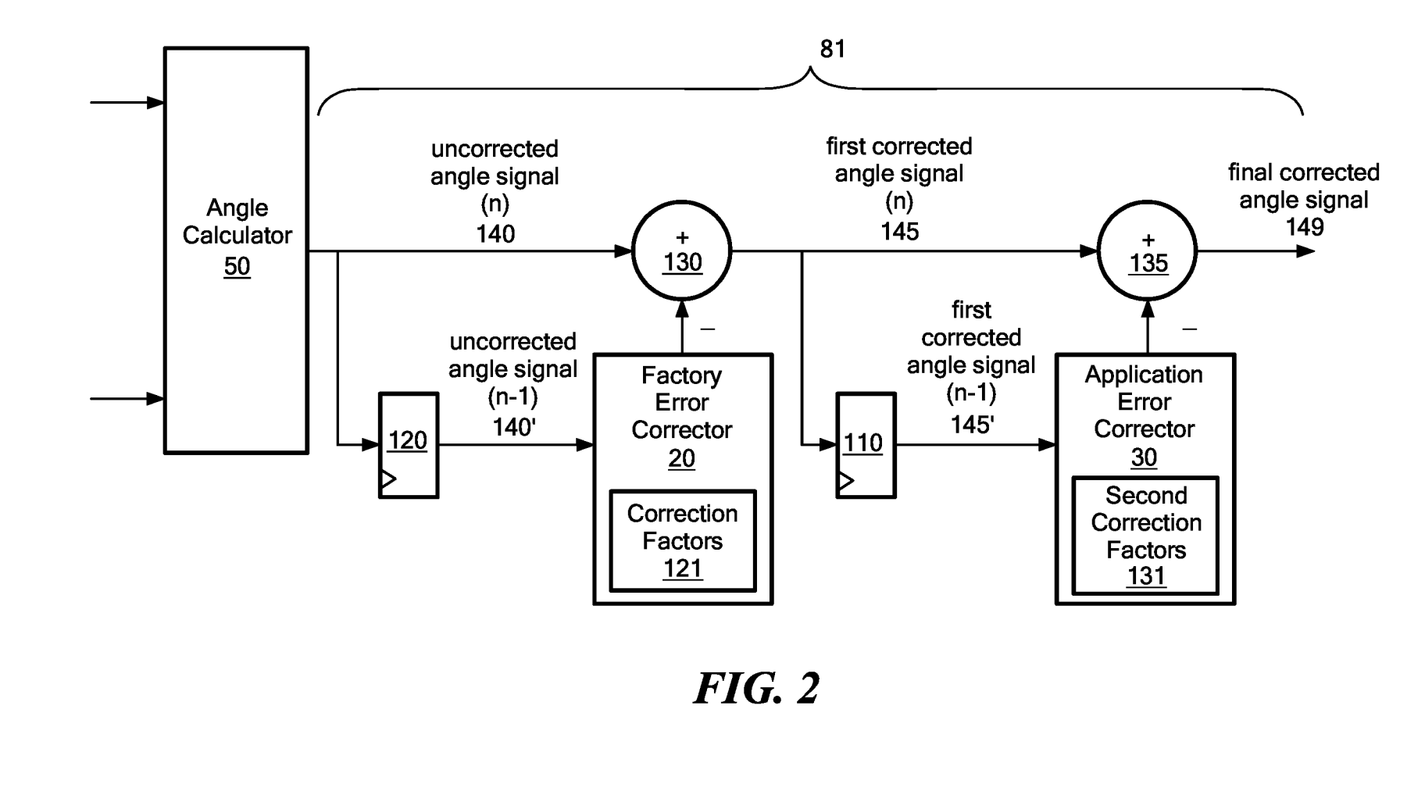
FIG. 2 is a block diagram illustrating an embodiment of an offline error correction sub-system within an angle sensor.

Illustrated in FIG. 2 is a digital signal processor 81 that is an improvement of the digital signal processor 80 described in FIG. 1. This digital signal processor 81 executes in parallel with a process for sampling the uncorrected angle signal 140 output by the angle calculator 50. The improved digital signal processor 81 permits the angle sensor 10 to provide high resolution angular position, speed and direction information with minimal or low latency. This minimal or low latency can be achieved by reducing an amount of time required for the angle sensor 10 to process, error-correct and calibrate the raw sensor output to generate angular, speed or directional information that can be used within a particular application.

In the digital signal processor 81, the factory error corrector 20 and the application error corrector 30 execute in parallel to generate error values using previous samples of the uncorrected angle signal 140, (i.e., uncorrected angle signal (n−1) 140') and previous samples of the first corrected angle signal 145 (i.e., first corrected angle signal (n−1) 145') to generate error values. These error values are applied to the uncorrected angle signal 140 and the first corrected angle signal 145 along the forward path, or the main signal path, to generate the final corrected angle signal 149. By removing the signal processing of the factory error corrector 20 and the application error corrector 30 from the main signal path, the amount of time required to correct and calibrate the uncorrected angle signal 140 can be reduced thereby reducing the latency of the angle sensor 10. Generating the error values offline from the main signal path does not require additional circuitry that would alter the power or space requirements of the angle sensor 10. Existing error correctors can be used in conjunction with this modified digital signal processor 81.

The digital signal processor 81 can sample one or more uncorrected angle signal 140 samples from the angle calculator 50, where each of these samples can be denoted by "n" such that angle signal (n) 140 refers to the "nth" sample. While the digital signal processor 81 samples the angle signal (n) 140 and moves it along the main signal path, a copy of the sampled uncorrected angle signal 140 corresponding to the nth sample is saved in memory 120. In some instances, the memory 120 can be an EEPROM or any other memory suitable for saving uncorrected angle signal 140 sample information. The digital signal processor 81 or correctors or other processing applications executing within the processor 81 can sample the uncorrected angle signal 140 and any other signals along the main signal path (i.e., the first corrected angle signal (n) 145) at a high sample rate such as at a sample rate of every two milliseconds.

The digital signal processor 81 samples the nth sample of the uncorrected angle signal 140 in parallel with the execution of the factory error corrector 20 and/or the application error corrector 30. Within the digital signal processor 81, the factory error corrector 20 can be configured to retrieve from memory 120 the previous sample of the uncorrected angle signal (n−1) 140' and uses this previous sample 140' to generate an error value by applying correction factors 121 to the previously sampled uncorrected angle signal' (n−1) 140'. Equation 3 is a modified version of Equation 1 that demonstrates the algorithms carried out within the factory error corrector 20 when said algorithms are applied to previous samples of the uncorrected angle signal (n) 140:

$$\text{Angle}'(n) = \text{Angle}(n) - \Sigma_{k=0}^{N} A_k \sin(k\,\text{Angle}(n-1) + \theta_k) \quad \text{Equation 3}$$

where Angle'(n) is the first corrected angle signal (n) 145, Angle(n) is the current sample of the uncorrected angle signal 140, Angle (n−1) is the previous sample of the uncorrected angle signal 140', $A_k$ is the amplitude coefficient and $\theta_k$ is the phase coefficient for harmonic k, and "N" represents the number of harmonics over which the summation should operate. The correction factors 121 include the amplitude coefficient $A_k$ and the phase coefficient $\theta_k$ for each error harmonic of a sample. In some instances, these correction factors 121 correspond to factory errors that may or may not be present in the angle sensor 10.

In this instance of the digital signal processor 81, the factory error corrector 20 applies the correction factors 121 to each error harmonic a previous sample of the uncorrected angle signal (n−1) 140'. A sample of the uncorrected angle signal (n) 140 can have a plurality of error harmonics, or k error harmonics. Thus, each sample can have k number of correction factors 121. In some embodiments, the factory error corrector 20 aggregates the results of applying the correction factors 121 to a plurality of error harmonics of a sample to generate the error value. While Equation 3 demonstrates applying the correction factors 121 to a single previous sample, in other embodiments the error value can be generated by applying correction factors 121 to one or more previous samples of the uncorrected angle signal (n) 140. For example, the correction factors 121 can be applied to three previous samples, i.e., uncorrected angle signal (n−1) 140', uncorrected angle signal (n−2) 140'', and uncorrected angle signal (n−3) 140'''.

The digital signal processor 81 uses the error value generated by the factory error corrector 20 to correct the uncorrected angle signal (n) 140. In some instances, the digital signal processor 81 corrects the uncorrected angle signal (n) 140 at an error correction point 130 on the main signal path. This error correction point 130 can be a summation element that responds to receiving the current sample of the uncorrected angle signal (n) 140 by applying the error value to the current sample to yield a first corrected angle signal (n) 145. In some instances, applying the error value can include subtracting the error value from the current sample of the uncorrected angle signal (n) 140.

The error value can be used by the digital signal processor 81 to adjust or correct a current sample of the uncorrected angle signal 140 on the main signal path without a substantial time delay in an amount of time between when the angle calculator 50 outputs the uncorrected angle signal (n) 140 and when the digital signal processor 81 outputs the final corrected angle signal 149. While the calculation of the error value and the adjustment of the uncorrected angle signal 140 are described herein in discrete terms, the calculation of the error value and the adjustment of the uncorrected angle signal 140 can happen continuously while the angle sensor 10 operates and while the digital signal processor 81 samples the uncorrected angle signal 140 and stores the sampled signal 140 in memory.

The digital signal processor 81 can store a sample of the first corrected angle signal (n) 145 in memory 110 while simultaneously moving forward along the signal path to another error correction point 135. The processor 81 operates in parallel to sample and store the first corrected angle signal (n) 145 and execute the application error corrector 30 to generate a second error value. The application error corrector 30 generates the second error value by applying a second set of correction factors 131 to a previous sample of the first corrected angle signal (n−1) 145' obtained from memory 110. The second error value can be calculated using Equation 4 which is a modified version of Equation 2:

$$\text{Angle Output} = \text{Angle}'(n) - \left[\frac{y_{k+1} - y_k}{x_{k+1} - x_k}(\text{Angle}'(n+1) - x_k) + y_k\right] \quad \text{Equation 4}$$

where Angle Output is the final corrected angle signal 149, Angle'(n) is the current sample of the first corrected angle signal (n) 145, Angle'(n−1) is the previous sample of the first corrected angle signal (n−1) 145', $\{x_0 \ldots x_{N-1}\}$ is an ordered set of linearization coefficients that represents the segment boundaries of the previous sample of the first corrected angle signal 145' input to the application error corrector 30, and $y_i$ are the angle errors to correct at each $x_i$. The correction factors 131 include the ordered set of linearization coefficients, $\{x_0 \ldots x_{N-1}\}$, and the angle errors, $y_i$, that are corrected for each $x_i$. There are k sets of correction factors 131 corresponding to the k number for each sample. In some instances, the second set of correction factors 131 are associated with a system in which the angle sensor 10 is operated such that the factors 131 correspond to system errors generated as a result of the angle sensor 10 operating within an end-user system. Additionally, or in other instances, the second set of correction factors 131 are associated with calibration coefficients used to calibrate an angle sensor 10 for use in a particular system or application and so that the sensor 10 operates according to a calibrated set of parameters.

In this instance of the digital signal processor 81, the application error corrector 30 applies the correction factors 131 to a previous sample of the first corrected angle signal (n−1) 145' by applying a piecewise linear function of correction coefficients $x_k$, $y_k$ to the previous sample. Each sample can have k number of correction factors 131. In some embodiments, the application error corrector 30 aggregates the results of applying the k number of correction factors 131 to a sample to generate the second error value. While Equation 4 demonstrates applying the correction factors 131 to a single previous sample, in other embodiments the second error value can be generated by applying correction factors 131 to one or more previous samples of the first corrected angle signal (n) 145. For example, the correction factors 131 can be applied to three previous samples, i.e., first corrected angle signal (n−1) 145', first corrected angle signal (n−2) 145'', and first corrected angle signal (n−3) 145'''.

The digital signal processor 81 uses the second error value generated by the application error corrector 30 to correct the first corrected angle signal (n) 145. To correct the first corrected angle signal (n) 145, the digital signal processor 81 subtracts the second error value from the first corrected angle signal (n) 145 at an error correction point 135 on the main signal path. This error correction point 135 can be a summation element that responds to receiving the current sample of the first corrected angle signal (n) 145 by applying the second error value to the current sample 145 to yield a final corrected angle signal (n) 149. In some embodiments, applying the second error value can include subtracting the second error value from the current sample of the first corrected angle signal (n) 145.

The second error value can be used by the digital signal processor 81 to further adjust or correct the first corrected angle signal 145 on the main signal path without a substantial time delay in an amount of time between when the angle calculator 50 outputs the uncorrected angle signal (n) 140 and when the digital signal processor 81 outputs the final corrected angle signal 149. While the calculation of the second error value and the adjustment of the first corrected angle signal 145 are described herein in discrete terms, the calculation of the second error value and the adjustment of the first corrected angle signal 145 can happen continuously while the angle sensor 10 operates and while the digital signal processor 81 samples the first corrected angle signal 145 and stores the sampled signal 145 in memory.

When the digital signal processor 81 operates on angle sensor 10 output obtained from measuring a stationary target 12, the modified equations (i.e. Equation 3 and Equation 4) can produce substantially zero error. When the target 12 is moving, the amount of error can be bounded based on the maximum error correction applied, the maximum speed of the target 12 and the throughput of the main signal path. This maximum error can be obtained by applying a maximum delta angle between samples (using maximum speed and signal path throughput) to the error corrector 20, 30 at its maximum derivative point. This maximum error should be minimized to ensure the angle sensor 10 operates within an amount of allowable error.

Although the digital signal processor 81 illustrated in FIG. 2 uses both a factory error corrector 20 and an application error corrector 30, the signal processor 81 can use either error corrector 20, 30 individually. For example, one instance of the digital signal processor 81 can comprise only a factory error corrector 20, and another instance of the digital signal processor 81 can comprise only an application error corrector 30. Furthermore, other types of error correction circuitry and techniques, or post-processing of the signal can be performed in the described offline manner in which the error corrector operates in parallel with the main forward signal path and in some instances, on a previous sample of the signal processed in the main forward signal path such as temperature correction.

Figure 3:
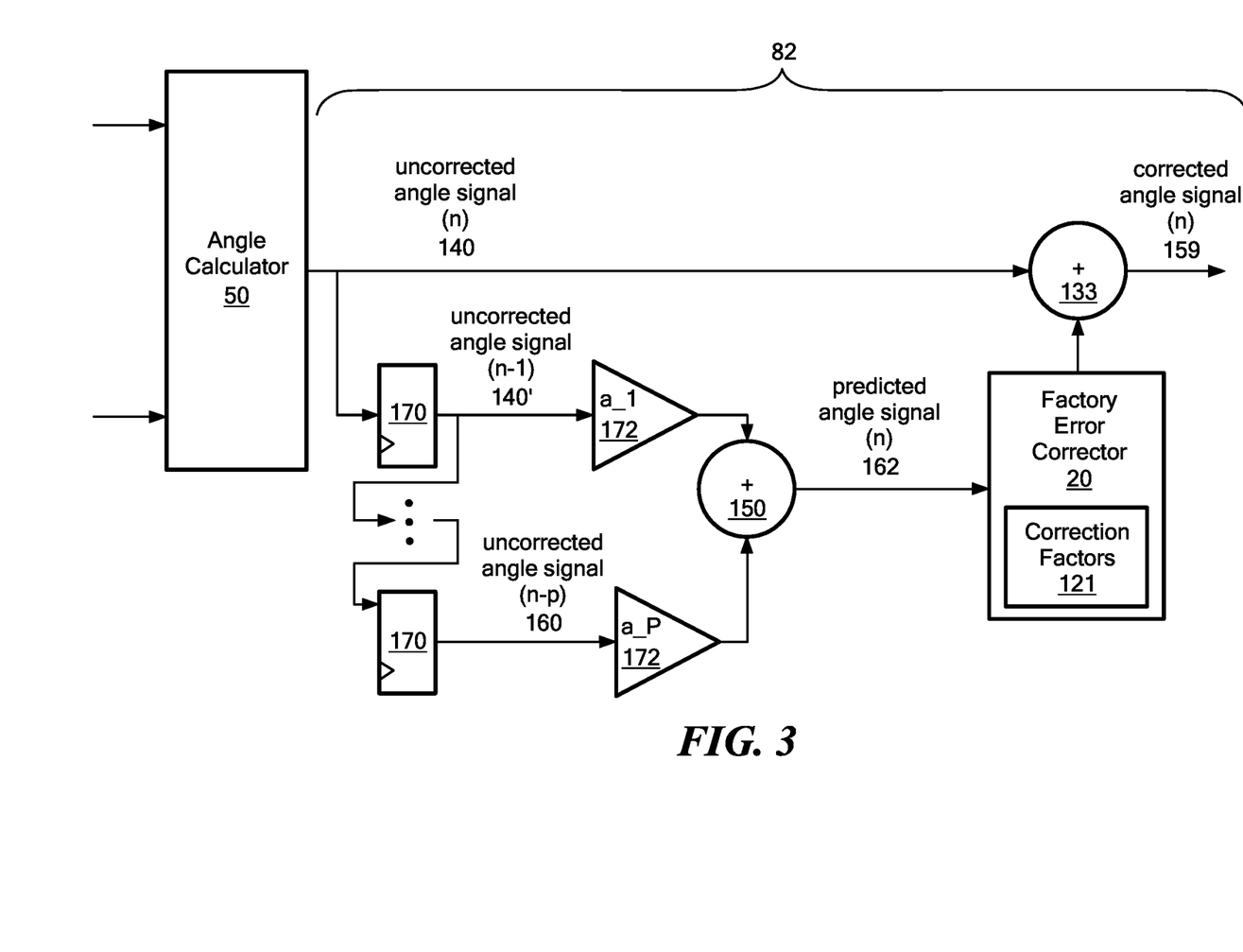
FIG. 3 is a block diagram illustrating an embodiment of an offline error correction sub-system within an angle sensor.

Illustrated in FIG. 3 is an enhancement to the digital signal processor 81 illustrated in FIG. 2. In this embodiment of the digital signal processor 82, any error introduced by using the offline error correction systems and methods described herein is further minimized by using a predictor in conjunction with the factory error corrector 20 and/or the application error corrector 30 to apply correction factors to a predicted current sample of the uncorrected angle signal 140 to generate an error value that can be applied to the current sample of the uncorrected angle signal (n) 140 to generate a corrected angle signal (n) 159.

In this instance, the digital signal processor 82 samples the uncorrected angle signal (n) 140 and stores a copy of the sampled signal in one or more memory locations 170. These stored samples can be retrieved by the digital signal processor 82 or a sub-processor within the processor 82 to generate a predicted angle signal (n) 162. One or more previous samples of the uncorrected angle signal' (n−1) 140' can be combined by a summation element 150 to generate this predicted angle signal (n) 162. The number of previous samples used to generate the predicted angle signal (n) 162 can range from the "n-1" sample to the "n-p" sample, where "n" represents the sample most recently stored, and "p" represents an increasing value that starts at the value of "n" such that "n-p" represents the oldest stored sample. Each previous sample of the uncorrected angle signal 140 from the first sample (n−1) 140' to the last sample (n−p) 160 can be weighted by one or more gain elements 172 and then averaged by a summation element 150 to generate a predicted angle signal (n) 162. This summation can be carried out according to Equation 5:

$$\text{Angle Signal Estimation}(n) = \sum_{k=1}^{N} a_k \text{Angle}(n-k) \quad \text{Equation 5}$$

where Angle Signal Estimation (n) is the predicted angle signal (n) 162, $a_k$ is an amplitude weighting factor, k is the sample number of the uncorrected angle signal, coefficient, N is the number of previous samples of the uncorrected angle signal used to generate the predicted angle signal (n) 162, and Angle(n−k) is the uncorrected angle signal (n−1) 140'. The predicted angle signal (n) 162 sample can be referred to as a predicted value of the current sample of the uncorrected angle signal 140. Equation 5 can be any type of linear estimator that can use a single prior sample or "N" number of prior samples to predict the value of the current sample of the uncorrected angle signal 140. In some instances, the "N" number of prior samples can be consecutive samples while in other instances, the "N" prior samples are not consecutive. For example, every fifth sample could be used to predict the present value of the uncorrected angle signal 140.

The factory error corrector 20 applies correction factors 121 to the predicted angle signal (n) 162 sample to generate an error value. The digital signal processor 82 applies the error value to the uncorrected angle signal (n) 140 using a summation element 133 which subtracts the error value from the uncorrected angle signal (n) 140 to generate the corrected angle signal 159.

While FIG. 3 demonstrates a digital signal processor 82 that uses a factory error corrector 20, the digital signal processor 82 can use an application error corrector 30 (not shown) to generate a second error value that the digital signal processor 82 applies to the corrected angle signal 159 to further correct for application errors or errors associated with a system within which the angle sensor 10 is operated. Furthermore, the digital signal processor 82 can use both the factory error corrector 20 and application error corrector 30 together, or individually.

Using the estimated angle signal at a point in time, or sample "n", permits a reduction in the error introduced by using the offline error correction described herein. Such reduction can be due in part to the ability to select the order and coefficients of the predicted signal in applications where the throughput of the signal path is great enough that using the offline error corrector described in FIG. 2 and FIG. 3 would otherwise cause the angle sensor 10 to exceed a maximum amount of allowable error during operation.

The methods and systems described herein can be used in conjunction with applications, methods and systems described in U.S. Pat. No. 9,400,164 entitled "Magnetic Field Sensor and Related Techniques that Provide an Angle Correction Module" and issued on Jul. 26, 2016, and U.S. Pat. No. 9,389,060 entitled "Magnetic Field Sensor and Related Techniques that Provide an Angle Correction Module" and issued on Jul. 12, 2016, both of which are assigned to the Assignee of the subject disclosure and incorporated herein by reference in their entirety.

It should be appreciated that the circuit architectures and methods described herein are merely embodiments of the system for offline error correction, and that aspects of this system can be modified while maintaining the function of the system. All publications and references cited herein are expressly incorporated by reference in their entirety.

What is claimed is:

1. An angle sensor comprising:
   a plurality of magnetic field sensing elements configured to detect a magnetic field and generate a respective plurality of magnetic field signals;
   a processor responsive to the plurality of magnetic field signals and configured to generate an uncorrected angle signal indicative of an angle of the magnetic field;
   an error corrector configured to generate an error value using one or more previous samples of the uncorrected angle signal; and
   a summation element responsive to a current sample of the uncorrected angle signal and to the error value and configured to apply the error value to the current sample of the uncorrected angle signal to generate a corrected angle signal.

2. The angle sensor of claim 1 wherein the error corrector is configured to apply a correction factor to a previous sample of the uncorrected angle signal to generate the error value.

3. The angle sensor of claim 2 wherein the error corrector is configured to apply the correction factor to the previous sample of the uncorrected angle signal by applying amplitude and phase correction coefficients to a plurality of harmonics of the previous sample of the uncorrected angle signal to generate the error value.

4. The angle sensor of claim 2 wherein the correction factor corresponds to one or more factory errors associated with the angle sensor.

5. The angle sensor of claim 1 further comprising:
   a second error corrector configured to generate a second error value using one or more previous samples of the corrected angle signal; and
   a second summation element responsive to a current sample of the corrected angle signal and to the second error value and configured to apply the second error value to the current sample of the corrected angle signal to generate a second corrected angle signal.

6. The angle sensor of claim 5 wherein the second error corrector is configured to apply a second correction factor to a previous sample of the corrected angle signal to generate the second error value.

7. The angle sensor of claim 6 wherein the second error corrector is configured to apply the second correction factor to the previous sample of the corrected angle signal by applying a piecewise linear function of one or more correction coefficients to the previous sample of the corrected angle signal to generate the second error value.

8. The angle sensor of claim 6 wherein the second correction factor corresponds to one or more system errors associated with a system in which the angle sensor is operated.

9. The angle sensor of claim 1 further comprising a predictor configured to predict a current sample of the uncorrected angle signal based on the one or more previous samples of the uncorrected angle signal and wherein the error corrector is configured to apply the correction factor to the predicted current sample of the uncorrected angle signal to generate the error value.

10. The angle sensor of claim 9 wherein the correction factor corresponds to one or more factory errors associated with the angle sensor.

11. A method for correcting an angle signal of an angle sensor comprising:
    detecting a magnetic field to generate a plurality of magnetic field signals;
    generating an uncorrected angle signal indicative of an angle of the magnetic field;
    generating an error value using one or more previous samples of the uncorrected angle signal; and
    applying the error value to a current sample of the uncorrected angle signal to generate a corrected angle signal.

12. The method of claim 11 wherein detecting the magnetic field comprises detecting the magnetic field using a plurality of magnetic field sensing elements.

13. The method of claim 11 wherein generating the uncorrected angle signal comprises generating the uncorrected angle signal using a CORDIC processor.

14. The method of claim 11 wherein generating the error value further comprises applying a correction factor to a previous sample of the uncorrected angle signal.

15. The method of claim 14 wherein applying the correction factor to the previous sample of the uncorrected angle signal comprises applying amplitude and phase correction coefficients to a plurality of harmonics of the previous sample of the uncorrected angle signal.

16. The method of claim 15 wherein amplitude and phase correction coefficients correspond to one or more factory errors associated with the angle sensor.

17. The method of claim 11 further comprising:
generating a second error value using one or more previous samples of the corrected angle signal; and
applying the second error value to the corrected angle signal to generate a second corrected angle signal.

18. The method of claim 17 wherein applying the second correction factor to the previous sample of the corrected angle signal comprises applying a piecewise linear function of one or more correction coefficients to the previous sample of the corrected angle signal.

19. The method of claim 18 wherein the one or more correction coefficients correspond to one or more system errors associated with a system in which the angle sensor is operated.

20. The method of claim 11 further comprising:
predicting the current sample of the uncorrected angle signal based on the one or more previous samples of the uncorrected angle signal; and
applying a correction factor to the predicted current sample of the uncorrected angle signal to generate the error value.

21. An angle sensor comprising:
means for detecting a magnetic field to generate a plurality of magnetic field signals;
means for generating an uncorrected angle signal indicative of an angle of the magnetic field;
means for generating an error value using one or more previous samples of the uncorrected angle signal; and
means for applying the error value to a current sample of the uncorrected angle signal to generate a corrected angle signal.

* * * * *

UNITED STATES PATENT AND TRADEMARK OFFICE
CERTIFICATE OF CORRECTION

PATENT NO. : 11,333,486 B2
APPLICATION NO. : 16/593308
DATED : May 17, 2022
INVENTOR(S) : Nicolas Rigoni et al.

It is certified that error appears in the above-identified patent and that said Letters Patent is hereby corrected as shown below:

In the Specification

Column 4, Line 16 delete "hall" and replace with --Hall--.

Column 5, Equation 1 delete "…$\sum_{K=0}^{N} A_K$…" and replace with --…$\sum_{k=0}^{N} A_k$…--.

Column 5, Line 60 delete "Ok" and replace with --$\theta_k$--.

Column 7, Line 51 delete "signal'" and replace with --signal--.

Column 7, Equation 3 delete "$\sum_{K=0}^{N} A_K \sin(k\, Angle\, (n-1) + \theta_k)$" and replace with --$\sum_{k=0}^{N} A_k \sin(k\, Angle\, (n-1) + \theta_k)$--.

Column 7, Line 63 delete "Ok" and replace with --$\theta_k$--.

Column 7, Line 66 delete "Ok" and replace with --$\theta_k$--.

Column 8, Equation 4 delete "…(n+1)…" and replace with --…(n-1)…--.

Column 10, Line 10 delete "corrector" and replace with --correctors--.

Column 10, Line 45 delete "'signal'" and replace with --signal--.

Column 11, Line 2 delete "Nis" and replace with --$N$ is--.

Signed and Sealed this
Twenty-seventh Day of June, 2023

*Katherine Kelly Vidal*
Katherine Kelly Vidal
*Director of the United States Patent and Trademark Office*